(12) United States Patent
Kuno et al.

(10) Patent No.: US 6,755,489 B2
(45) Date of Patent: Jun. 29, 2004

(54) CONTROL DEVICE FOR ELECTRIC VEHICLE STOPPING AT SLOPE ROAD

(75) Inventors: Tetsuya Kuno, Toyota (JP); Masahiro Inden, Kariya (JP)

(73) Assignee: Aisin Seiki Kabushiki Kaisha, Kariya (JP)

( * ) Notice: Subject to any disclaimer, the term of this patent is extended or adjusted under 35 U.S.C. 154(b) by 29 days.

(21) Appl. No.: 10/319,548

(22) Filed: Dec. 16, 2002

(65) Prior Publication Data

US 2004/0012250 A1 Jan. 22, 2004

(30) Foreign Application Priority Data

Dec. 17, 2001 (JP) .......................................... 2001-383437

(51) Int. Cl.$^7$ .............................. B60T 7/12; B60T 8/24; B60T 13/66; B60K 41/00; B60K 41/20
(52) U.S. Cl. ......................... 303/191; 303/20; 303/192; 303/152; 477/901; 188/156
(58) Field of Search .............................. 303/192, 3, 20, 303/112, 191, 152; 188/156, 181 T, 158; 701/70, 91; 180/65.1, 165; 318/432; 477/114, 92, 901, 93, 95, 120, 194–198, 203–206

(56) References Cited

U.S. PATENT DOCUMENTS

| | | | | |
|---|---|---|---|---|
| 5,457,363 A | * | 10/1995 | Yoshii et al. | 318/432 |
| 2003/0221881 A1 | * | 12/2003 | Lee | 180/65.2 |
| 2004/0012250 A1 | * | 1/2004 | Kuno et al. | 303/20 |
| 2004/0026989 A1 | * | 2/2004 | Suzuki et al. | 303/89 |

* cited by examiner

Primary Examiner—Douglas C. Butler
(74) Attorney, Agent, or Firm—Burns, Doane, Swecker & Mathis, L.L.P.

(57) ABSTRACT

A control device for an electric vehicle stopping at a slope road which reduces a power consumption of the electric motor when the vehicle is stopping at the slope road with the generation of a drive torque. The device judges the stopping state of the vehicle at the slope road when a condition that a throttle opening degree is not zero, that the drive torque is not zero, and that a vehicle speed is zero continues for a predetermined time, applies a hydraulic pressure P relative to wheel cylinder, and decreases the drive torque outputting to the motor to be zero. The device judges a release of the stopping state at the slope road when a condition that a throttle opening degree becomes greater than a throttle opening degree under the vehicle stopping state at the slope road, recovers the drive torque, and gradually releases an application of the hydraulic pressure to the wheel cylinder.

20 Claims, 4 Drawing Sheets

CONTROL DEVICE FOR ELECTRIC VEHICLE STOPPING AT SLOPE ROAD

This application is based on and claims priority under 35 U.S.C. §119 with respect to Japanese Patent Application No. 2001-383437 filed on Dec. 17, 2001, the entire content of which is incorporated herein by reference.

FIELD OF THE INVENTION

The present invention relates to a control device for a vehicle stopping at a slope road having an electric motor as a power source. More particularly, the present invention pertains to a control device for a vehicle stopping at a slope road under a condition that a drive torque of an electric motor is generated.

BACKGROUND OF THE INVENTION

Electric motors, which serve as power sources for electric vehicles, are supplied with the electric power from in-vehicle batteries. Because limited electric energy is charged in the battery installed in the vehicle, the mileage of the electric vehicle per charge of the battery installed in the vehicle is limited.

In order to deliver more mileage of the electric vehicle per charge of the battery installed in the vehicle, not only a hydraulic brake by a braking hydraulic pressure but also a regenerative braking force generated at driving wheels when recovering the electric power, which is generated in the electric motor by the rotation of the driving wheels, into the battery installed in the vehicle is maximally applied at braking the electric vehicle according to known devices. With the application of the regenerative braking force, because the electric power corresponding to the generated regenerative braking force is recovered into the battery installed in the vehicle, more mileage of the electric vehicle per charge of the battery installed in the vehicle is delivered.

Notwithstanding, in order to further increase mileage of the electric vehicle per charge of the battery installed in the vehicle, it is important to reduce the electric power consumption per se in the battery installed in the vehicle by the operation of the electric motor while utilizing the regenerative, braking force.

Under the condition that the vehicle is at stopping state on the slope road while balancing the drive torque and the down-sloping directional component of the gravity generated relative to the vehicle when the drive torque of the electric motor is generated by operating a throttle pedal, the electric power in the battery installed in the vehicle is consumed for generating the drive torque of the electric motor irrespective of the stopping state of the vehicle. This condition is expected to be caused particularly when the traffic congestion is caused on the slope road and when an operator is waiting at stoplights on the slope road. This is because the operator can control a stop and a start of the vehicle by adjusting the depression amount of the throttle pedal instead of operating the brake pedal when the vehicle is stopping at the slope road.

The electric power consumed under the foregoing condition does not contribute to the vehicle driving, and thus the electric power consumption under the foregoing condition is required to be reduced.

A need exists for a control device for an electric vehicle stopping at a slope road which enables to reduce the electric power consumption of an electric motor in case the electric vehicle is stopped on the slope road under a state that a drive torque of the electric motor is generated.

SUMMARY OF THE INVENTION

In light of the foregoing, the present invention provides a control device for an electric vehicle stopping at a slope road which includes an electric motor for driving a wheel, a drive torque control means for controlling a drive torque of the electric motor in accordance with a driving condition of the vehicle and outputting the drive torque to the electric motor, a hydraulic brake force adjusting means for adjusting a hydraulic brake force for applying a hydraulic pressure to a wheel cylinder of the wheel independent from a brake pedal operation, and a judging means for a stopping state at a slope road which judges whether the vehicle is under a stopping state at a slope road when the drive torque is equal to or greater than the predetermined value. When the judging means for the stopping state at the slope road judges that the vehicle is under the stopping state at the slope road, the hydraulic brake force adjusting means applies a predetermined hydraulic pressure to the wheel cylinder of the wheel and the drive torque control means decreases a drive torque outputted to the electric motor to be lower than a drive torque controlled in accordance with a driving condition of the vehicle.

BRIEF DESCRIPTION OF THE DRAWING FIGURES

The foregoing and additional features and characteristics of the present invention will become more apparent from the following detailed description considered with reference to the accompanying drawing figures in which like reference numerals designate like elements.

DETAILED DESCRIPTION OF THE INVENTION

Figure 1:
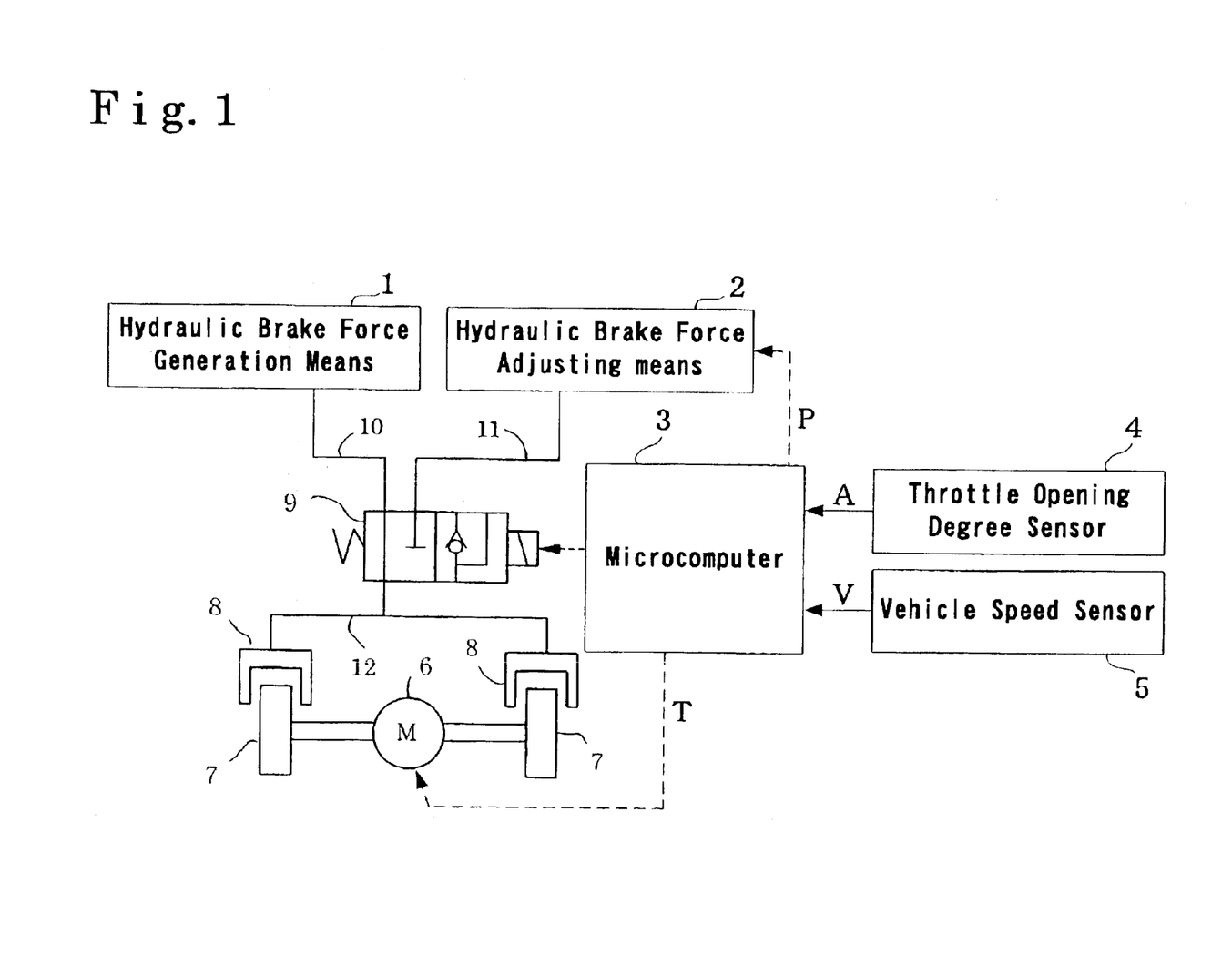
FIG. 1 is a systematic view of a control device for an electric vehicle stopping at a slope road according to an embodiment of the present invention.

One embodiment of a control device for an electric vehicle stopping at a slope road will be explained with reference to the illustrations in the drawing figures. FIG. 1 shows a systematic view of a control device for an electric vehicle stopping at a slope road according to an embodiment of the present invention. Only driving wheels out of vehicle wheels are shown in FIG. 1 for simplifying the drawing.

A hydraulic brake force generation means 1, shown in FIG. 1, includes a brake pedal and a master cylinder for generating the braking hydraulic pressure in accordance with the operation of the brake pedal. A booster for boosting the brake pedal operation may be provided between the brake pedal and the master cylinder. Known master cylinders and boosters are applicable and the construction and the operation thereof are not explained here.

The braking hydraulic pressure generated by the hydraulic brake force generation means 1 is supplied to wheel cylinders 8 of driving wheels 7 via a hydraulic passage 10, a three-ports two positions type solenoid valve 9, and a hydraulic passage 12. The wheel cylinders 8 affects the hydraulic brake force to the driving wheels 7 in accordance with the braking hydraulic pressure supplied from the hydraulic brake pressure generation means 1.

A hydraulic brake force adjusting means 2 includes a hydraulic pump, a motor for actuating the hydraulic pump, an accumulator for accumulating the high pressurized brake fluid outputted from the hydraulic pump, and a hydraulic pressure adjusting device having plural solenoid valves which adjust the high pressurized brake hydraulic pressure accumulated in the accumulator to be reduced to a hydraulic pressure P, for generating the brake hydraulic pressure corresponding to the hydraulic pressure P based on a signal showing the hydraulic pressure P outputted from a microcomputer 3 (i.e., the microcomputer serves as a drive torque control means, a vehicle stopping state at slope road judging means, a drive torque memory means, and a throttle opening degree memory means). The motor and the hydraulic pressure adjusting device are properly operated on the basis of a command from the microcomputer 3. The detailed explanation for each component is not provided because the construction and the operation thereof are widely known.

The brake hydraulic pressure generated by the hydraulic brake force adjusting means 2 is supplied to the wheel cylinders 8 of the driving wheels 7 via the hydraulic passage 11, the solenoid valve 9, and the hydraulic passage 12. The wheel cylinders 8 applies the hydraulic brake force to the driving wheels 7 in accordance with the braking hydraulic pressure supplied from the hydraulic brake force adjusting means 2.

The solenoid valve 9 is switched to be a non-excited state (shown in FIG. 1) and an excited state by means of the command from the microcomputer 3. The solenoid valve 9 establishes the communication between the hydraulic passage 10 and the hydraulic passage 12 and interrupts the communication between the hydraulic passage 11 and the hydraulic passage 12 under the non-excited state. Thus, in this case, the brake hydraulic pressure in accordance with the operational force of the brake pedal generated by the hydraulic brake force generation means 1 is supplied to the wheel cylinders 8.

On the other hand, under the excited state of the solenoid valve 9, the communication between the hydraulic passage 11 and the hydraulic passage 12 is established and the hydraulic passage 10 and the hydraulic passage 12 are connected via a check valve for allowing a brake fluid flow only from the hydraulic passage 10 to the hydraulic passage 12. Thus, in this case, the hydraulic pressure P on the basis of the command from the microcomputer 3 generated by the hydraulic brake force adjusting means 2 is supplied to the wheel cylinders 8. In case the brake hydraulic pressure in accordance with the operational force of the brake pedal generated in the hydraulic brake adjusting means 1 is greater than the hydraulic pressure P, the check valve in the solenoid valve 9 is opened and the brake hydraulic pressure generated in the hydraulic brake generation means 1 is supplied to the wheel cylinders 8 prior to the hydraulic pressure P. That is, the brake pedal can be repeatedly depressed under the condition that the hydraulic pressure in the wheel cylinders 8 is adjusted by the hydraulic brake force adjusting means 2.

The driving wheels 7 are driven by a motor 6. The motor 6 is operated based on a signal indicating a drive torque T outputted from the microcomputer 3 for applying the drive torque T to the driving wheels 7.

The motor 6, the hydraulic brake force adjusting minas 2, and the solenoid valve 9 are controlled by the microcomputer 3 as explained above. The microcomputer 3 may include a central processing unit (CPU), a read-on memory (ROM), a random access memory (RAM) and an input and output port device, all of which are connected one another via bilateral common busses.

The input and output port device of the microcomputer 3 is inputted with a signal indicating a vehicle speed V from a vehicle speed sensor 5, a signal indicating a throttle opening degree A from a throttle opening degree sensor 4, and other signals from sensors which are not shown.

Figure 2:
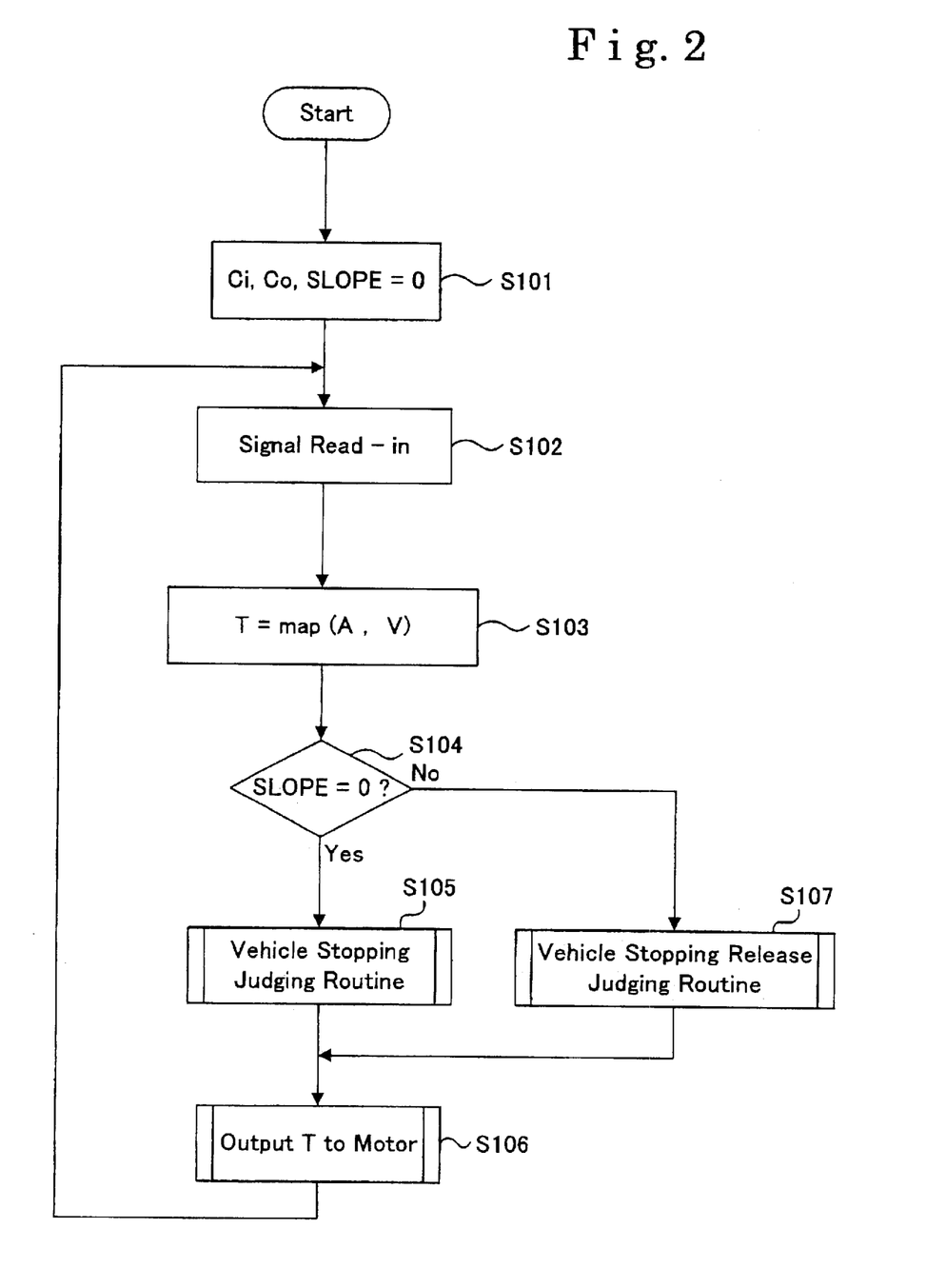
FIG. 2 is a flowchart showing a control routine for the vehicle stopping at the slope road according to the embodiment of the present invention.
Figure 3:
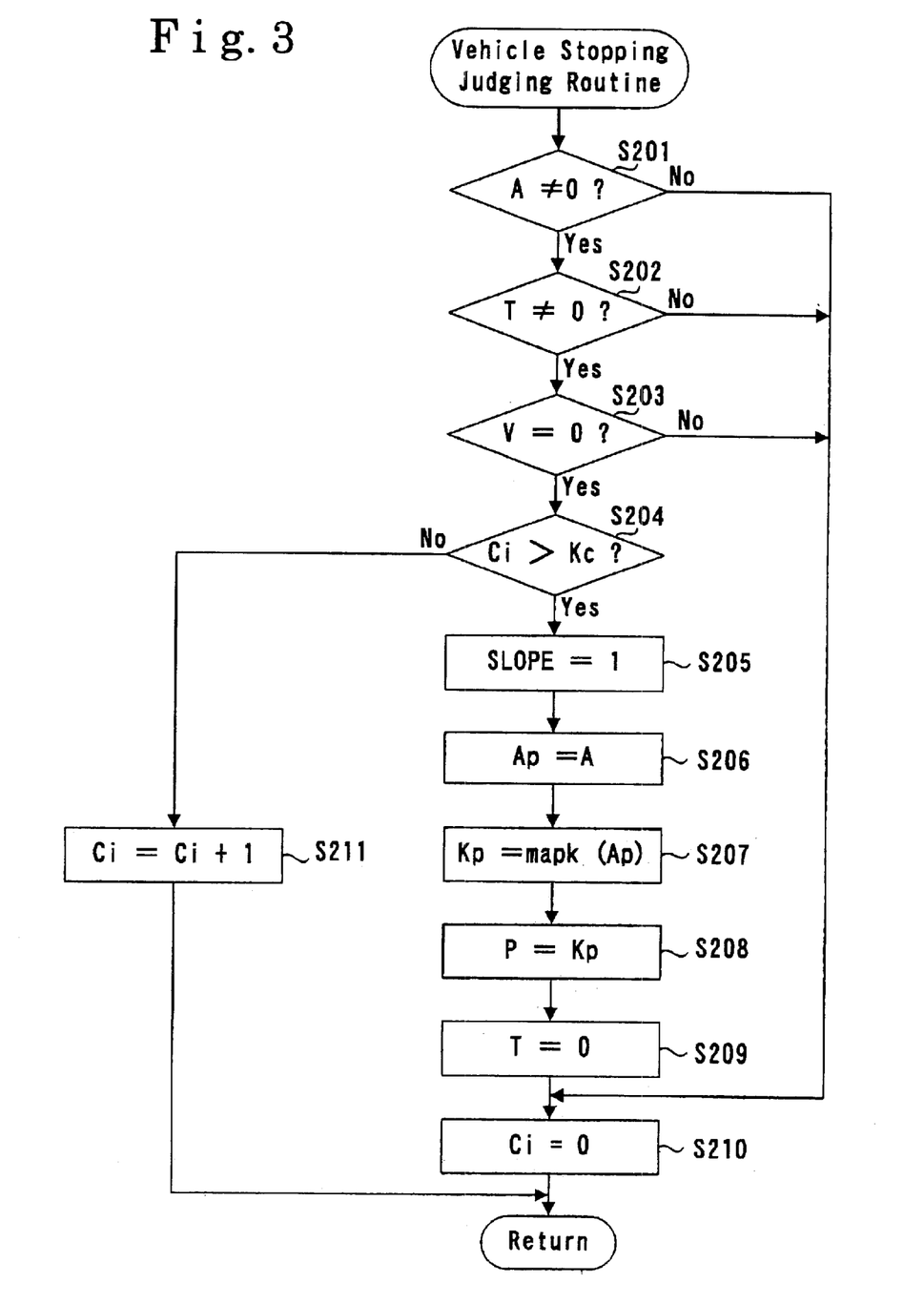
FIG. 3 is a flowchart showing a vehicle stopping judging routine according to the embodiment of the present invention.
Figure 4:
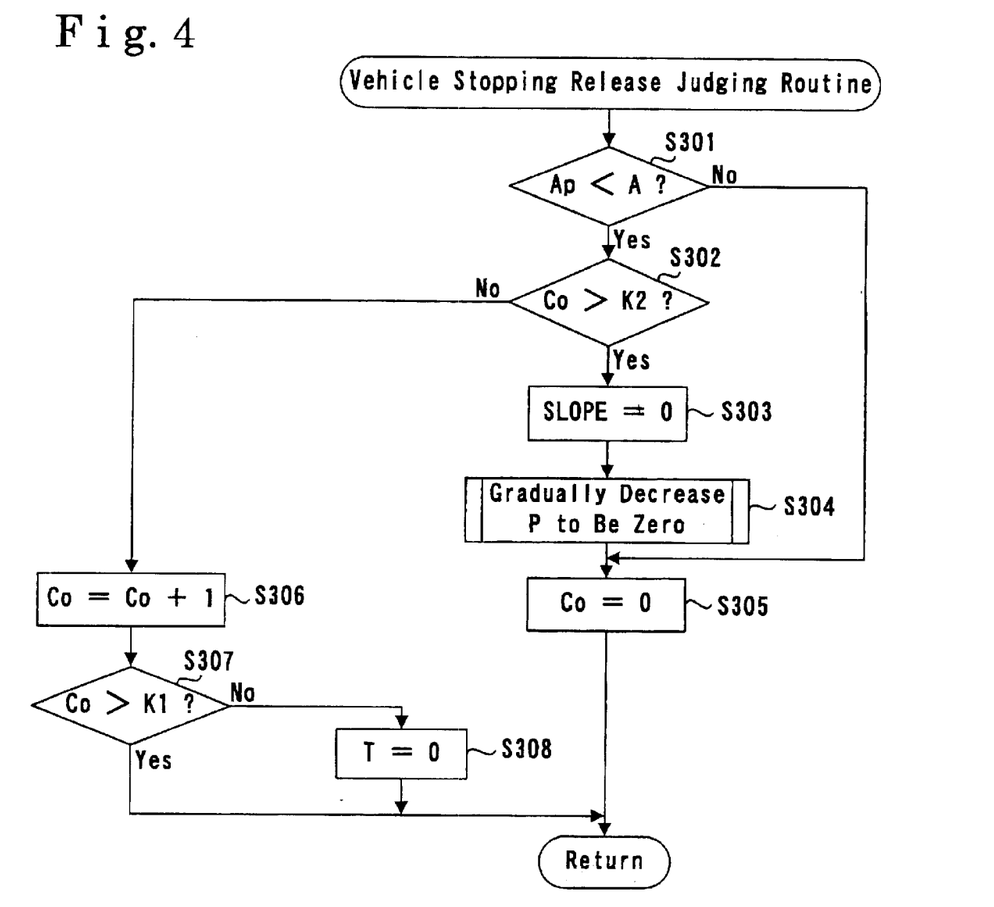
FIG. 4 is a flowchart showing a vehicle stopping release judging routine according to the embodiment of the present invention.
Figure 5:
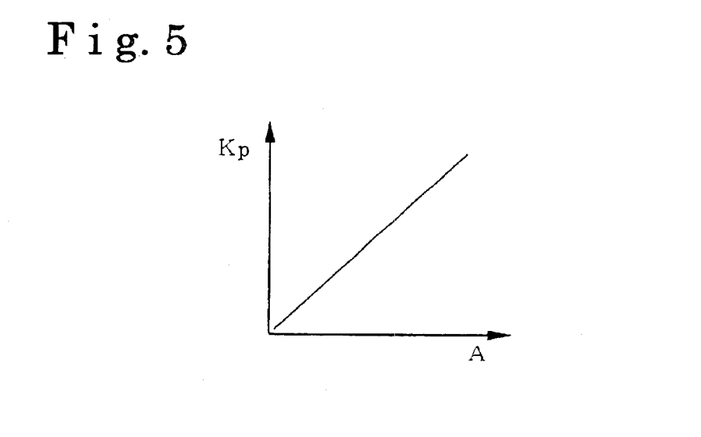
FIG. 5 is a graph showing a relationship between a throttle opening degree A and a braking hydraulic pressure Kp which is to be applied.

The ROM of the microcomputer 3 memorizes control flows of FIGS. 2–4 and a map of FIG. 5. The CPU performs various calculation based on parameters detected by the various sensors, obtains the drive torque T of the driving wheels 7 and the hydraulic pressure P which should be generated by the hydraulic brake force adjusting means 2 outputs the signal indicating the drive torque T to the motor 6, and outputs the signal indicating the hydraulic pressure P to the hydraulic brake force adjusting means 2.

The operation of the control device for the electric vehicle at the slope road having the foregoing system will be explained as follows.

The microcomputer 3 maintains the solenoid valve 9 under the non-excited state without outputting an excitation signal to the solenoid valve 9 under a normal driving state. Thus, under the normal driving state, the braking hydraulic pressure in accordance with the brake pedal operational force generated by the hydraulic brake force generation means 1 is supplied to the wheel cylinders 8 and the hydraulic pressure force in accordance with the brake pedal operational force is supplied to the driving wheels 7. The microcomputer 3 outputs a signal indicating that the hydraulic pressure P is equal to zero (i.e., P=0) to the hydraulic brake force adjusting means 2 so that the hydraulic brake force adjusting means 2 does not output the hydraulic pressure. Further, the microcomputer 3 is inputted with the signal indicating the throttle opening degree A from the throttle opening degree sensor 4, the signal indicating the vehicle speed V from the vehicle speed sensor 5, and other signals from other sensors for calculating the drive torque T appropriate for being applied to the driving wheels 7 using a map (not shown) memorized in the ROM (i.e., T=map (A, V)). The motor 6 applies the drive torque T to the driving wheels 7 based on the signal indicating the drive torque T outputted from the microcomputer 3. Accordingly, the electric vehicle is driven by the motor 6 by means of the appropriate drive torque T and the braking thereof is controlled by the hydraulic brake force in accordance with the brake pedal operational force under the normal driving state.

When the microcomputer 3 judges that the vehicle state is shifted from the normal driving state to a stopping state at the slope road, the microcomputer 3 outputs the excitation signal to the solenoid valve 9 for maintaining the solenoid valve at the excited state, calculate the hydraulic pressure P in accordance with a throttle opening degree Ap under the stopping state at the slope road, and outputs a signal indicating the hydraulic pressure P to the hydraulic brake force adjusting means 2. The microcomputer 3 outputs a signal indicating that the drive torque T is equal to zero (i.e., T=0) to the motor 6. Thus, when it is judged that the vehicle is under the stopping state at the slope road by the microcomputer 3, the hydraulic pressure P generated by the hydraulic brake force adjusting means 2 affects the wheel cylinders 8 to generate the hydraulic brake force corresponding to the hydraulic pressure P in the driving wheels 7. And thus, the vehicle can maintain the stopping state at the slope road. In this case, because the drive torque T of the motor 6 is equal to zero (i.e., T=0), the electric energy consumed by the motor 6 becomes zero.

When it is judged that the vehicle state is released from the stopping state at the slope road by the microcomputer 3, the microcomputer 3 calculates the drive torque T (i.e., T=map (A, V)) for recovering the torque T while outputting the excitation signal to the solenoid valve 9 and maintaining the solenoid valve 9 under the excited state, and outputs the signal indicating the drive torque T to the motor 6. Then, the microcomputer 3 outputs a signal for gradually decreasing the hydraulic pressure P to the hydraulic brake force adjusting means 2. When the hydraulic pressure P is decreased to be zero, the system recovers the normal driving state by the microcomputer 3 by releasing the output of the excitation signal to the solenoid valve 9 to maintain the solenoid valve 9 under the non-excited state. Thus, the smooth start of the electric vehicle is achieved because the electric vehicle is started to drive by the appropriate drive torque T by the motor 6 and the hydraulic brake force is gradually decreases.

Referring to the flowcharts shown in FIGS. 2–4, the details of the control routine for stopping the electric vehicle at the slope road will be explained. The control following the flowcharts shown in FIGS. 2–4 is started by an ignition switch (not shown).

In Step 101 of FIG. 2, the initialization of counters Ci, Co and a flag SLOPE are performed and zero (0) is inputted into the counters Ci, Co and the flag SLOPE. The counter Ci functions for forming a waiting time for a control flow of FIG. 3. The counter Co is for forming a waiting time for a control flow of FIG. 4. The flag SLOPE corresponds to a flag for distinguishing whether the vehicle is under the stopping state at the slope road. "SLOPE=0" shows that the vehicle is not under the stopping state at the slope road. "SLOPE=1" shows that the vehicle is under the stopping state at the slope road.

In Step 102, the signal indicating the throttle opening degree A detected by the throttle opening sensor 4 and the signal indicating the vehicle speed V detected by the vehicle sensor 5 are read-in.

In Step 103, appropriate drive torque T (i.e., T=map (A, V)) which should be applied to the driving wheels 7 is calculated by the map memorized in the ROM based on the input signals inputted from the throttle opening degree sensor 4, the vehicle speed sensors 5, and the other sensors.

In Step 104, whether the flag SLOPE is zero (i.e., SLOPE=0) is judged. When the flag SLOPE is equal to zero, it is judged that the vehicle is not under the stopping state at the slope road, thus the transaction is forwarded to Step 105. In Step 105, a vehicle stopping judging routine for judging whether the vehicle state is shifted to be the stopping state at the slope road shown in FIG. 3. On the other hand, when the flag SLOPE is equal to zero, it is judged that the vehicle is under the stopping state at the slope road, and thus the transaction is forwarded to Step 107. In Step 107, a vehicle stopping release judging routine for judging whether the stopping state of the vehicle at the slope road shown in FIG. 4 is released. The vehicle stopping judging routine shown in FIG. 3 and the vehicle stopping release judging routine shown in FIG. 4 will be explained hereinafter. The vehicle stopping judging routine of Step 105 is carried out at the initial stage of the control routine for the vehicle stopping at the slope road because the flag SLOPE is equal to zero in Step 101.

In Step 106, the signal showing the drive torque T after completing the execution of the vehicle stopping release judging routine of Step 107 or the vehicle stopping judging routine of Step 105 is outputted to the motor 6. The motor 6 applies the drive torque T to the driving wheels 7. Under the normal driving state and the under releasing the vehicle stopping state at the slope road, the drive torque T calculated in Step 103 as it is becomes the drive torque T in Step 106. Thus, the appropriate drive torque T (i.e., T=map (A, V)) is applied to the driving wheels 7. Under stopping state of the vehicle at the slope road, because the drive torque T is equal to zero (i.e., T=0) in Step 308 of FIG. 4 and Step 209 of FIG. 3, the drive torque T in Step 106 is equal to zero (i.e., T=0), thus the motor 6 does not generate the drive torque.

After Step 106 is carried out, the transactions from Step 102 are repeated.

The vehicle stopping judging routine will be explained with reference to the flowchart shown in FIG. 3. The vehicle stopping judging routine is carried out under the state that the flag SLOPE is equal to zero, which is not under the vehicle stopping state at the slope road. In Step 201, whether the throttle opening degree A is zero is judged from the signal indicating the throttle opening degree A inputted in Step 102. In Step 202, whether the drive torque T calculated in Step 103 is zero is judged. In step 203, it is judged whether the vehicle speed V is zero from the signal indicating the vehicle speed V inputted in Step 102. Otherwise, in Step 201, it may be judged whether the throttle opening degree A is equal to or greater than a predetermined opening degree A1 which is approximately zero. In Step 202, it may be judged whether the drive torque T is equal to or greater than a predetermined value T1 which is approximately zero.

When all conditions of Steps 201–203 are satisfied, it is judged that the vehicle is under the stopping state at the slope road and the transaction is forwarded to Step 204. When any one of those three conditions is not satisfied, it is not judged that the vehicle is under the stopping state at the slope road and the transaction is forwarded to Step 210. In Step 210, the counter Ci is cleared to be zero (i.e., Ci=0), then the transaction is returned to Step 106 of FIG. 2.

In Step 204, it is judged whether the counter Ci exceeds a constant Kc memorized in the ROM. When the counter Ci exceeds the constant (i.e., integer) Kc, it is judged that the vehicle is under the stopping state at the slope road to forward the transaction to Step 205. When the counter Ci is not exceeding the constant Kc, the transaction is forward to Step 211. After the counter Ci is incremented by one in Step 211, the transaction is returned to Step 106 of FIG. 2. That is, the counter Ci is for forming the waiting time and in Step 204, it is judged that the vehicle is under the stopping state at the slope road only when the state that all conditions of Step 201–203 are satisfied continues for a predetermined time during which the vehicle stopping judging routine is carried out "constant Kc plus one" times. In case the sate that any one of the conditions in Steps 201–203 is not satisfied before elapsing the predetermined time, the counter Ci is cleared to be zero in Step 210. The counter is cleared because it is judged that the vehicle is not under stopping state at the slope road and in order to judge the vehicle is under the stopping state at the slope road when all conditions of Step 201–203 are continuously satisfied for the predetermined time.

When it is judged that the vehicle is under the stopping state at the slope road in Step 204, the transaction is forwarded to Step 205. In Step 205, the flag SLOPE is determined to be one. Thus, it is recognized that the vehicle is under the stopping state at the slope road. In step 206, a value of the throttle opening degree A at the moment is memorized in a parameter Ap in the RAM. In Step 207, a value corresponding to the parameter Ap is inputted in a parameter Kp using a map corresponding to a graph shown in FIG. 5. In this case, the parameter Kp corresponds to the hydraulic pressure P outputted from the hydraulic brake force adjusting means 2. Thus, the hydraulic pressure P is determined to be the value being proportional to the throttle opening degree A as shown in FIG. 5. Otherwise, the hydraulic pressure P may be determined as a value being proportional to the drive torque T which has a constant relationship with the throttle opening degree A.

In Step 208, the hydraulic pressure P being equal to the parameter Kp (i.e., P=Kp) is applied to the wheel cylinders 8. The microcomputer 3 outputs the excitation signal to the solenoid valve 9 for maintaining the solenoid valve 9 under the excited state and outputs the signal indicating that the hydraulic pressure P being equal to the parameter Kp to the hydraulic brake force adjusting means 2. Thus, the hydraulic brake force adjusting means 2 generates the hydraulic pressure P, the hydraulic brake force corresponding to the hydraulic pressure P is generated in the driving wheels 7 by applying the generated hydraulic pressure to the wheel cylinders 8, and thus the vehicle can maintain the stopping state at the slope road.

In Step 209, zero is inputted into the drive torque T. After the counter Ci is cleared in Step 210, the transaction is returned to Step 106. In Step 209, the drive torque T is not limited to zero and may be a value smaller than the value of the drive torque T under the normal driving state which is calculated in Step 103 of FIG. 2.

The state after completing the execution of the vehicle stopping judging routine of FIG. 3 will be restated as follows. When it is judged that the vehicle is under the normal driving state which is not under the vehicle stopping state at the slope road, the drive torque T remains the drive torque T which was calculated in Step 103. On the other hand, when it is judged that the vehicle is under the stopping state at the slope road, the drive torque T corresponds to zero in Step 209. The signal indicating the foregoing drive torque T is outputted to the motor 6 in Step 106 and the motor 6 applies the drive torque T to the driving wheels 7. When it is judged that the vehicle is under the stopping state at the slope road, the hydraulic brake force corresponding to the hydraulic pressure P is generated in the driving wheels 7 to maintain the vehicle stopping state at the slope road.

The vehicle stopping release judging routine will be explained with reference to the flowchart shown in FIG. 4 as follows. The vehicle stopping release judging routine is carried out under the state that the flag SLOPE corresponds to one (SLOPE=1) which is under the stopping state at the slope road. In Step 301, it is judged whether the current throttle opening degree A, inputted in Step 102 of FIG. 2, is greater than the parameter Ap memorized in the RAM in Step 206 of FIG. 3. When the parameter Ap is greater than the throttle opening degree A, it is judged that the vehicle is not under the condition for releasing the stopping state at the slope road and the transaction is forwarded to Step 305. After the counter Co is cleared in Step 305, the transaction is returned to Step 106 of FIG. 2. When the throttle opening degree A is greater than the parameter Ap, it is judged that the stopping state at the slope road can be released. Then, the transaction is forwarded to step 302.

In Step 302, it is judged whether the counter Co exceeds a constant (integer) K2 (i.e., K2 is greater than a constant (integer) K1) memorized in the ROM. When the counter Co exceeds the constant K2, it is judged that the stopping state at the slope road is to be released, then the transaction is, forwarded to the Step 303. When the counter Co is equal to or less that the constant K2, the transaction is forwarded to Step 306. After incrementing the counter Co by one in Step 306, it is judged whether the counter Co exceeds the constant K1 in Step 307. When the counter Co exceeds the constant K1 in Step 307, the transaction is returned to Step 106 of FIG. 2. When the counter Co is equal to or less than the constant K1, the transaction is forwarded to Step 308. After determining the drive torque T being zero (i.e. T=0) in Step 308, the transaction is returned to Step 106 of FIG. 2. In Step 308, the drive torque T is not limited to zero and may be a value smaller than the drive torque under the normal driving state which is calculated in Step 103 of FIG. 2.

That is, the counter Co is for forming the waiting time, and in Step 302, the release of the stopping state at the slope road is judged only when the state for satisfying the condition in Step 302 continues for a predetermined time during which the vehicle stopping release judging routine is carried out for "constant K2 plus one" times.

When the state that satisfies the condition of Step 301 continues for the time during which the vehicle stopping release judging routine is carried out for the constant K1 times (i.e., less than the constant K2) before elapsing the predetermined time, the drive torque T is returned to the value under the normal driving state by maintaining the drive torque T to have the value calculated in Step 1043 of FIG. 2 instead of determining the drive torque being equal to zero as a preparation before judging the release of the stopping state at the slope road.

When the state that the conditions of Step 301 is not satisfied is generated before elapsing the predetermined time, the counter Co is cleared in Step 305. The counter Co is cleared because it is judged that the release of the stopping state of the slope road is not allowed and for judging the release of the stopping state at slope road when the condition of Step 301 is continuously satisfied for the predetermined time next time.

When the release of the stopping state at slope road is judged in Step 302, the transaction is forwarded to Step 303. In Step 303, the flag SLOPE is determined to be zero. Thus, it is recognized that the stopping state at slope road is released and the vehicle is under the normal driving state.

In Step 304, the hydraulic pressure P is gradually reduced from the value corresponding to the parameter Kp (i.e., P=Kp) applied in Step 208 of FIG. 3 to be zero. That is, the microcomputer 3 outputs the signal for gradually decreasing the hydraulic pressure P from the parameter Kp to zero while outputting the excitation signal to the solenoid valve 9 and maintaining the solenoid valve 9 under the excited state. Thus, the hydraulic brake force adjusting means 2 gradually decreases the hydraulic pressure P and the hydraulic pressure applied to the wheel cylinders 8 is gradually decreased eventually to be zero. Accordingly, because the hydraulic brake force affecting the driving wheels 7 is gradually decreased under the state that the drive torque T has already recovered the value under the normal drive state, the vehicle performs the smooth start.

After the counter Co is cleared in Step 305, the transaction is returned to Step 106 of FIG. 2.

As explained above, the state after completing the execution of the vehicle stopping release judging routine will be stated as follows. The drive torque T remains the drive torque T calculated in Step 103 in case the judgment for releasing the stopping state at the slope road is performed after continuing the state which satisfies the condition of the Step 301 for the time during which the vehicle stopping release judging routine for the constant K1 (i.e., less than the constant K2) times. On the other hand, the drive torque T is equal to zero in Step 308 when it is judged that the release of the stopping state at the slope road is not allowed. The signal indicating the value of the drive torque T is outputted to the motor 6 in Step 106 of FIG. 2. The motor 6 applies the drive torque T to the driving wheels 7. The hydraulic brake force generated at the driving wheels 7 is gradually decreased at the state after performing the judgment for releasing the stopping state at the slope road. When the judgment of the release of the stopping state of the slope road has not performed, the stopping state of the vehicle at the slope road is maintained while generating the hydraulic brake force corresponding to the hydraulic pressure P being equal to the parameter Kp (P=Kp) to the driving wheels 7.

With the control device for the vehicle stopping at the slope road according to the embodiment, the microcomputer 3 determines the drive torque T outputted to the motor 6 to be zero (Step 209) when the microcomputer 3 judges that the vehicle is under the stopping state at the slope road under the condition that the drive torque T is not zero (Step 204). Thus, the electric power consumption consumed by the motor 6 is reduced under the stopping state at the slope road of the vehicle.

In this case, the microcomputer 3 applies the hydraulic brake force to the vehicle by applying the hydraulic pressure P being equal to the parameter Kp (P=Kp) to the wheel cylinders 8 of the driving wheels 7 (Step 208) The parameter Kp is calculated as the value being proportional to the throttle opening degree A (i.e., the throttle opening degree Ap when the vehicle is under the stopping state at the slope road (Step 206)) which has a constant proportional relationship with the drive torque T (Step 207). Thus, the hydraulic pressure P that the microcomputer 3 commands to apply to the wheel cylinders 8 of the driving wheels 7 when it is judged that the vehicle is under the stopping state at the slope road (Step 204) is determined in accordance with the drive torque T balancing with the component in the down sloping direction of the gravity affecting the vehicle. Accordingly, because the hydraulic pressure P is determined to be the minimum hydraulic pressure Kp which prevents the movement of the vehicle to go down the slope by the gravity, the energy consumption of the hydraulic brake force adjusting means 2 per se during the control for stopping the vehicle at the slope road can be reduced.

With the control device for the vehicle stopping at the slope road according to the embodiment, the microcomputer 3 judges that the vehicle is under the stopping state at the slope road when the throttle opening degree A detected by the throttle opening degree sensor 4 is not zero, the vehicle speed V detected by the vehicle speed sensor 5 is zero and the drive torque T calculated at the moment (Step 103) is not: zero (Steps 201–203). Thus, the judgment that the vehicle is under the stopping state at the slope road can be performed utilizing the throttle opening degree sensor and the vehicle speed sensor which are installed for performing the drive control of the motor in the normal electric vehicle. Because it is not required to supply additional sensors for judging the stopping state of the electric vehicle at the slope road, the control device for the vehicle state stopping at the slope road can be easily constructed with the low manufacturing cost.

Further, with the control device for the vehicle stopping at the slope road according to the embodiment, the microcomputer 3 judges the stopping state of the vehicle at the slope road when the state which satisfies the all conditions of Steps 201–203 continues for the predetermined time (Step 204). Thus, when the foregoing state does not continues for the predetermined time, the microcomputer 3 does not judge that the vehicle is at the stopping state at the slope road. Accordingly, in case the vehicle starts after stopping a short period shorter than the predetermined time, the vehicle is not judged being under the stopping state at the slope road. Because that the vehicle is under the stopping state at the slope road is not judged in case the vehicle starts after stopping for a short period which is shorter than the predetermined time, unnecessary and intricate performance of the control for the vehicle stopping at the slope road can be prevented.

With the control device for the vehicle stopping at the slope road according to the embodiment, the release of the vehicle stopping judgment at the slope road is performed under the condition that the throttle opening degree A detected by the throttle opening degree sensor 4 is greater than the throttle opening degree Ap at the moment under the stopping state at the slope road continues for the predetermined time range (Step 302). When the microcomputer 3 judges the release of the stopping state a the slope road, the drive torque T outputted to the motor 6 is returned to the drive torque controlled in accordance with the driving state of the vehicle (Step 307). Then the application of the hydraulic pressure to the wheel cylinders 8 of the driving wheels 7 is gradually released (Step 304).

Thus, under the stopping state of the vehicle at the slope road, the operator can release the stopping state at the slope road by stepping on the throttle pedal for the predetermined continuous time so that the throttle opening degree A becomes greater than the throttle opening degree Ap which is at the start of the control for the vehicle stopping at the slope road. In case the operator stepping on the throttle pedal by accident for a very short period, the unintentional judgment for releasing the stopping state at the slope road can be prevented. Further, when it is judged that the stopping state at the slope road is released, the drive torque T outputted to the motor 6 is returned to the drive torque under the normal driving state which is controlled in accordance with the driving state of the vehicle such as the throttle opening degree, then the hydraulic brake force is gradually decreased. Thus, the smooth start of the vehicle can be performed.

The present invention is not limited to the foregoing embodiment and the variations are performed within the scope of the present invention. For example, although only the motor is applied as the power source for the electric vehicle with the foregoing embodiment, the vehicle may be a hybrid vehicle which is driven by the cooperation of the engine and the motor.

Further, the ABS control and the traction control may be performed by providing a hydraulic pressure control device having plural solenoid valves on the hydraulic passage 12 of FIG. 1 in the foregoing embodiment and by controlling the hydraulic pressure control device by the microcomputer 3.

According to the embodiment of the present invention, the control device for the electric vehicle stopping at the slope road which can reduce the power consumption of the motor when the electric vehicle is stopping at the slope road under the condition that the drive torque of the motor is generated, is provided.

According to the embodiment of the present invention, the drive torque control means decreases the drive torque outputted to the motor to be lower than the normal drive torque controlled in accordance with the driving condition of the vehicle when the judging means for stopping state at the slope road judges that the vehicle is under the stopping state at the slope road under the condition that the drive torque is equal to or greater than the predetermine value. Thus, the power consumption consumed by the electric motor is reduced under the stopping state of the vehicle at the slope road.

The hydraulic brake force adjusting means in this case applies the hydraulic brake force to the vehicle by applying the predetermined hydraulic pressure to the wheel cylinders of the wheels. Thus, by determining the predetermined hydraulic pressure to be the degree which prevents the vehicle going down the slope by the gravity, the vehicle under the stopping state at the slope road can maintain the stopping state.

According to the embodiment of the present invention, the judgment of the stopping state at the slope road can be performed utilizing the throttle opening degree detection means and the vehicle speed detection means provided for performing the drive control of the electric motor in the normal electric vehicle. Thus, because it is not necessary to provide additional sensors for performing the judgment that the electric vehicle is under the stopping state at the slope road, the vehicle stopping state at slope road judging means, thus the control device for vehicle stopping state at the slope road as a whole can be constructed easily and with the low manufacturing cost.

In this case, it is referable that the vehicle stopping state at slope road judging means judges that the vehicle is under the stopping state at the slope road when the condition that the throttle opening degree detected by the throttle opening degree detection means is equal to or greater than the predetermined opening degree, that the vehicle speed detected by the vehicle speed detection means is substantially zero and that the drive torque outputted from the drive torque control means is equal to or greater than the predetermined value continues for the predetermined continuous time period.

Thus, when the foregoing condition does not elapse for the predetermined time, the vehicle stopping state at slope road judging means does not judge that the vehicle is under the stopping state at the slope road. Accordingly, when the vehicle starts after stopping for a short period shorter than the predetermined time, it is not judged that the vehicle is under the stopping state at the slope road. The power consumed without contributing to the vehicle drive under the condition corresponds to the electric power consumed during stopping for the short period, and there are fewer requirements for the reduction of the power consumption in this case. Thus, when the vehicle starts after stopping for the short period shorter than the predetermined time, the judgments that the vehicle is under the stopping state is not performed. Accordingly, unnecessary and intricate control for stopping state at the slope road can be prevented.

The drive torque at the moment when it is judged the vehicle is at the stopping state at the slope road memorized in the drive torque memory means corresponds to the value balancing to the component of the gravity in the down sloping direction affecting the vehicle. Thus, the predetermined hydraulic pressure applied to the wheel cylinders of the driving wheels by the hydraulic brake force adjusting means when it is judged that the vehicle is under the stopping state that the slope road is determined in accordance with the drive torque which is balancing to the component of the gravity in the down sloping direction affecting the vehicle. Thus, because the predetermined hydraulic pressure can be determined to be the minimum hydraulic pressure which prevents the movement of the vehicle going down the slope road by the gravity, the energy consumption of the hydraulic pressure adjusting means per se during the stopping state of the slope control can be reduced.

The predetermined hydraulic pressure may be determined in accordance with the throttle opening degree memorized by the throttle opening memory means which can memorize the throttle opening degree detected by the throttle opening degree detection means when the judging means for stopping state at the slope road judges that the vehicle is under the stopping state at the slope road. For the normal electric vehicle, in case the drive torque of the electric motor, which is the power source, is controlled in accordance with the throttle opening degree, the drive torque memorized in the drive torque memory means and the throttle opening degree memorized in the throttle opening degree memory means have a constant relationship.

According to the embodiment of the present invention, the judging means for stopping state at the slope road judges the release of the stopping state at the slope road when the throttle opening degree detected by the throttle opening degree detection means becomes greater than the throttle opening degree memorized by the throttle opening degree memory means. Thus, the operator can release the stopping state of the vehicle at the slope road only by stepping on the throttle pedal to make the throttle opening degree be greater than the throttle opening degree at the start of the control for the stopping state at the slope road. In this case, the drive torque control means recovers the drive toque outputted to the electric motor to be the drive torque controlled in accordance with the driving condition of the vehicle such as the throttle opening degree and the hydraulic brake force adjusting means releases the application of the predetermined hydraulic pressure to the wheel cylinders of the vehicle. Thus, the vehicle can perform the smooth start.

It is preferable for performing the judgment for releasing the stopping state at the slope road when the condition that the throttle opening degree detected by throttle opening degree detection means is greater than the throttle opening degree memorized by the throttle opening degree memory means continues for the predetermined time period. When it is judged that the stopping state at the slope road is released by the judging means for stopping state at the slope road, it is preferable that the drive torque control means recovers the drive torque outputted to the electric motor to the drive torque controlled in accordance with the driving condition of the vehicle, then, the hydraulic brake force adjusting means gradually releases the application of the predetermined hydraulic pressure to the wheel cylinders of the driving wheels.

Thus, the release judgment for the stopping state at the slope road is not performed unless the condition that the actual throttle opening degree detected by the throttle opening degree detection means is greater than the throttle opening degree memorized in the throttle opening memory means continues for the predetermined time. Accordingly, unintentional performance of the release judgment of the stopping state at the slope road can be prevented in case the operator accidentally stepping on the throttle pedal for a brief moment. When it is judged that the stopping state at the slope road is released, the drive torque outputted to the electric motor is recovered to the drive torque controlled in accordance with the driving condition of the vehicle such as the throttle opening degree and then the hydraulic brake force is gradually decreased. Thus, the start of the vehicle can be smoothly performed.

The principles, preferred embodiment and mode of operation of the present invention have been described in the foregoing specification. However, the invention which is intended to be protected is not to be construed as limited to the particular embodiment disclosed. Further, the embodiment described herein is to be regarded as illustrative rather than restrictive. Variations and changes may be made by others, and equivalents employed, without departing from the spirit of the present invention. Accordingly, it is expressly intended that all such variations, changes and equivalents which fall within the spirit and scope of the present invention as defined in the claims, be embraced thereby.

What is claimed is:

1. A control device for an electric vehicle stopping at a slope road comprising:

an electric motor for driving a wheel;

a drive torque control means for controlling a drive torque of the electric motor in accordance with a driving condition of the vehicle and outputting the drive torque to the electric motor;

a hydraulic brake force adjusting means for adjusting a hydraulic brake force for applying a hydraulic pressure to a wheel cylinder of the wheel independent from a brake pedal operation;

a judging means for a stopping state at a slope road which judges whether the vehicle is under a stopping state at a slope road when the drive torque is equal to or greater than the predetermined value;

wherein when the judging means for the stopping state at the slope road judges that the vehicle is under the stopping state at the slope road, the hydraulic brake force adjusting means applies a predetermined hydraulic pressure to the wheel cylinder of the wheel and the drive torque control means decreases a drive torque outputted to the electric motor to be lower than a drive torque controlled in accordance with a driving condition of the vehicle.

2. A control device for an electric vehicle stopping at a slope road according to claim 1, wherein the judging means for stopping state at the slope road comprises a throttle opening degree detection means for detecting a throttle operating degree and a vehicle speed detection means for detecting a vehicle speed of the vehicle, and wherein the judging means for stopping state at the slope road judges that the vehicle is under the stopping state at the slope road when a throttle opening degree detected by the throttle opening degree detection means is equal to or greater than a predetermined value, a vehicle speed detected by the vehicle speed detection means is substantially zero, and a drive torque outputted by a drive torque control means is equal to or greater than the predetermined value.

3. A control device for an electric vehicle stopping at a slope road according to claim 2, wherein the judging means for the stopping state at the slope road judges that the vehicle is under the stopping state at the slope road when a throttle opening degree detected by the throttle opening degree detection means is equal to or greater than a predetermined value, a vehicle speed detected by the vehicle speed detection means is substantially zero, and when a condition that a drive torque outputted by the drive torque control means is equal to or greater than the predetermined value continues for a predetermined time.

4. A control device for an electric vehicle stopping at a slope road according to claim 2, wherein the judging means for the stopping state at the slope road comprises a drive torque memory means for memorizing a drive torque outputted by the drive torque control means at a moment when the judging means for the stopping state at the slope road judges that the vehicle is under the stopping state at the slope road; and wherein the predetermined hydraulic pressure applied to the wheel cylinder of the wheel by the hydraulic brake force adjusting means when the judging means for the stopping state at the slope road judges that the vehicle is under the stopping state at the slope road is determined in accordance with the drive torque memorized in the drive torque memory means.

5. A control device for an electric vehicle stopping at a slope road according to claim 3, wherein the judging means for the stopping state at the slope road comprises a drive torque memory means for memorizing a drive torque outputted by the drive torque control means at a moment when the judging means for the stopping state at the slope road judges that the vehicle is under the stopping state at the slope road; and wherein the predetermined hydraulic pressure applied to the wheel cylinder of the wheel by the hydraulic brake force adjusting means when the judging means for the stopping state at the slope road judges that the vehicle is under the stopping state at the slope road is determined in accordance with the drive torque memorized in the drive torque memory means.

6. A control device for an electric vehicle stopping at a slope road according to claim 2 further comprising a throttle opening degree memory means for memorizing a throttle opening degree detected by the throttle opening degree detection means at a moment when the judging means for the stopping state at the slope road judges that the vehicle is under the stopping state at the slope road; wherein the predetermined hydraulic pressure applied to the wheel cylinder of the wheel by the hydraulic brake force adjusting means when the judging means for stopping at the slope road judges that the vehicle is under the stopping state at the slope road is determined in accordance with the throttle opening degree memorized in the throttle opening degree memory means.

7. A control device for an electric vehicle stopping at a slope road according to claim 3 further comprising a throttle opening degree memory means for memorizing a throttle opening degree detected by the throttle opening degree detection means at a moment when the judging means for the stopping state at the slope road judges that the vehicle is under the stopping state at the slope road; wherein the predetermined hydraulic pressure applied to the wheel cylinder of the wheel by the hydraulic brake force adjusting means when the judging means for stopping at the slope road judges that the vehicle is under the stopping state at the slope road is determined in accordance with the throttle opening degree memorized in the throttle opening degree memory means.

8. A control device for an electric vehicle stopping at a slope road according to claim 2, further comprising a throttle opening degree memory means for memorizing a throttle opening degree detected by the throttle opening degree detection means at a moment when the judging means for the stopping state at the slope road judges that the vehicle is under the stopping state at the slope road; wherein the judging means for stopping state at the slope road judges a release of the stopping state at the slope road when a throttle opening degree detected by the throttle opening degree detection means becomes greater than the throttle opening degree memorized in the throttle opening degree memory means after judging the stopping state of the vehicle at the slope road; and wherein the drive torque control means recovers a drive torque outputted to the electric motor to the drive torque controlled in accordance with the driving condition of the vehicle and the hydraulic brake force adjusting means releases the application of the predetermined hydraulic pressure to the wheel cylinder of the wheel when the judging means for the stopping state at the slope road judges that the stopping state of the vehicle at the slope road is released.

9. A control device for an electric vehicle stopping at a slope road according to claim 3, further comprising a throttle opening degree memory means for memorizing a throttle opening degree detected by the throttle opening degree detection means at a moment when the judging means for the stopping state at the slope road judges that the vehicle is under the stopping state at the slope road; wherein the judging means for stopping state at the slope road judges a release of the stopping state at the slope road when a throttle opening degree detected by the throttle opening degree detection means becomes greater than the throttle opening degree memorized in the throttle opening degree memory means after judging the stopping state of the vehicle at the slope road; and wherein the drive torque control means recovers a drive torque outputted to the electric motor to the drive torque controlled in accordance with the driving condition of the vehicle and the hydraulic brake force adjusting means releases the application of the predetermined hydraulic pressure to the wheel cylinder of the wheel when the judging means for the stopping state at the slope road judges that the stopping state of the vehicle at the slope road is released.

10. A control device for an electric vehicle stopping at a slope road according to claim 4, further comprising a throttle opening degree memory means for memorizing a throttle opening degree detected by the throttle opening degree detection means at a moment when the judging means for the stopping state at the slope road judges that the vehicle is under the stopping state at the slope road; wherein the judging means for stopping state at the slope road judges a release of the stopping state at the slope road when a throttle opening degree detected by the throttle opening degree detection means becomes greater than the throttle opening degree memorized in the throttle opening degree memory means after judging the stopping state of the vehicle at the slope road; and wherein the drive torque control means recovers a drive torque outputted to the electric motor to the drive torque controlled in accordance with the driving condition of the vehicle and the hydraulic brake force adjusting means releases the application of the predetermined hydraulic pressure to the wheel cylinder of the wheel when the judging means for the stopping state at the slope road judges that the stopping state of the vehicle at the slope road is released.

11. A control device for an electric vehicle stopping at a slope road according to claim 5, further comprising a throttle opening degree memory means for memorizing a throttle opening degree detected by the throttle opening degree detection means at a moment when the judging means for the stopping state at the slope road judges that the vehicle is under the stopping state at the slope road; wherein the judging means for stopping state at the slope road judges a release of the stopping state at the slope road when a throttle opening degree detected by the throttle opening degree detection means becomes greater than the throttle opening degree memorized in the throttle opening degree memory means after judging the stopping state of the vehicle at the slope road; and wherein the drive torque control means recovers a drive torque outputted to the electric motor to the drive torque controlled in accordance with the driving condition of the vehicle and the hydraulic brake force adjusting means releases the application of the predetermined hydraulic pressure to the wheel cylinder of the wheel when the judging means for the stopping state at the slope road judges that the stopping state of the vehicle at the slope road is released.

12. A control device for an electric vehicle stopping at a slope road according to claim 6, further comprising a throttle opening degree memory means for memorizing a throttle opening degree detected by the throttle opening degree detection means at a moment when the judging means for the stopping state at the slope road judges that the vehicle is under the stopping state at the slope road; wherein the judging means for stopping state at the slope road judges a release of the stopping state at the slope road when a throttle opening degree detected by the throttle opening degree detection means becomes greater than the throttle opening degree memorized in the throttle opening degree memory means after judging the stopping state of the vehicle at the slope road; and wherein the drive torque control means recovers a drive torque outputted to the electric motor to the drive torque controlled in accordance with the driving condition of the vehicle and the hydraulic brake force adjusting means releases the application of the predetermined hydraulic pressure to the wheel cylinder of the wheel when the judging means for the stopping state at the slope road judges that the stopping state of the vehicle at the slope road is released.

13. A control device for an electric vehicle stopping at a slope road according to claim 7, further comprising a throttle opening degree memory means for memorizing a throttle opening degree detected by the throttle opening degree detection means at a moment when the judging means for the stopping state at the slope road judges that the vehicle is under the stopping state at the slope road; wherein the judging means for stopping state at the slope road judges a release of the stopping state at the slope road when a throttle opening degree detected by the throttle opening degree detection means becomes greater than the throttle opening degree memorized in the throttle opening degree memory means after judging the stopping state of the vehicle at the slope road; and wherein the drive torque control means recovers a drive torque outputted to the electric motor to the drive torque controlled in accordance with the driving condition of the vehicle and the hydraulic brake force adjusting means releases the application of the predetermined hydraulic pressure to the wheel cylinder of the wheel when the judging means for the stopping state at the slope road judges that the stopping state of the vehicle at the slope road is released.

14. A control device for an electric vehicle stopping at a slope road according to claim 6, wherein the judging means for stopping state at the slope road judges a release of the stopping state at the slope road when the throttle opening degree detected by the throttle opening degree detection means becomes greater than the throttle opening degree memorized in the throttle opening degree memory means after judging that the vehicle is under the stopping state at the slope road; wherein the drive torque control means recovers a drive torque outputted to the electric motor to be a drive torque controlled in accordance with a driving condition of the vehicle when the judging means for stopping at the slope road judges the release of the stopping state at the slope road; and wherein the hydraulic brake force adjusting means releases the application of the predetermined hydraulic pressure to the wheel cylinder of the wheel.

15. A control device for an electric vehicle stopping at a slope road according to claim 7, wherein the judging means for stopping state at the slope road judges a release of the stopping state at the slope road when the throttle opening degree detected by the throttle opening degree detection means becomes greater than the throttle opening degree memorized in the throttle opening degree memory means after judging that the vehicle is under the stopping state at the slope road; wherein the drive torque control means recovers a drive torque outputted to the electric motor to be a drive torque controlled in accordance with a driving condition of the vehicle when the judging means for stopping at the slope road judges the release of the stopping state at the slope road; and wherein the hydraulic brake force adjusting means releases the application of the predetermined hydraulic pressure to the wheel cylinder of the wheel.

16. A control device for an electric vehicle stopping at a slope road according to claim 8, wherein the judging means for stopping state at the slope road judges a release of the stopping state at the slope road when a condition that the throttle opening degree detected by the throttle opening degree detection means becomes greater than the throttle opening degree memorized in the throttle opening degree memory means continues for a predetermined time after the stopping state at the slope road is judged; wherein the drive torque control means recovers the drive torque outputted to the electric motor to be the drive torque controlled in accordance with the driving condition of the vehicle when the judging means for stopping state at the slope road judges the release of the stopping state at the slope road; and wherein the hydraulic brake force adjusting means gradually releases the application of the predetermined hydraulic pressure to the wheel cylinder of the wheel.

17. A control device for an electric vehicle stopping at a slope road according to claim 9, wherein the judging means for stopping state at the slope road judges a release of the stopping state at the slope road when a condition that the throttle opening degree detected by the throttle opening degree detection means becomes greater than the throttle opening degree memorized in the throttle opening degree memory means continues for a predetermined time after the stopping state at the slope road is judged; wherein the drive torque control means recovers the drive torque outputted to the electric motor to be the drive torque controlled in accordance with the driving condition of the vehicle when the judging means for stopping state at the slope road judges the release of the stopping state at the slope road; and wherein the hydraulic brake force adjusting means gradually releases the application of the predetermined hydraulic pressure to the wheel cylinder of the wheel.

18. A control device for an electric vehicle stopping at a slope road according to claim 10, wherein the judging means for stopping state at the slope road judges a release of the stopping state at the slope road when a condition that the throttle opening degree detected by the throttle opening degree detection means becomes greater than the throttle opening degree memorized in the throttle opening degree memory means continues for a predetermined time after the stopping state at the slope road is judged; wherein the drive torque control means recovers the drive torque outputted to the electric motor to be the drive torque controlled in accordance with the driving condition of the vehicle when the judging means for stopping state at the slope road judges the release of the stopping state at the slope road; and wherein the hydraulic brake force adjusting means gradually releases the application of the predetermined hydraulic pressure to the wheel cylinder of the wheel.

19. A control device for an electric vehicle stopping at a slope road according to claim 12, wherein the judging means for stopping state at the slope road judges a release of the stopping state at the slope road when a condition that the throttle opening degree detected by the throttle opening degree detection means becomes greater than the throttle opening degree memorized in the throttle opening degree memory means continues for a predetermined time after the stopping state at the slope road is judged; wherein the drive torque control means recovers the drive torque outputted to the electric motor to be the drive torque controlled in accordance with the driving condition of the vehicle when the judging means for stopping state at the slope road judges the release of the stopping state at the slope road; and wherein the hydraulic brake force adjusting means gradually releases the application of the predetermined hydraulic pressure to the wheel cylinder of the wheel.

20. A control device for an electric vehicle stopping at a slope road according to claim 14, wherein the judging means for stopping state at the slope road judges the release of the stopping state at the slope road when a condition that the throttle opening degree detected by the throttle opening degree detection means becomes greater than the throttle opening degree memorized in the throttle opening degree memory means continues for a predetermined time after the stopping state at the slope road is judged; wherein the drive torque control means recovers the drive torque outputted to the electric motor to be the drive torque controlled in accordance with the driving condition of the vehicle when the judging means for stopping state at the slope road judges the release of the stopping state at the slope road; and wherein the hydraulic brake force adjusting means gradually releases the application of the predetermined hydraulic pressure to the wheel cylinder of the wheel.

* * * * *